United States Patent [19]

Brecy et al.

[11] 4,394,604
[45] Jul. 19, 1983

[54] CONTROL APPARATUS FOR AN ELECTRO-MECHANICAL DEVICE THAT GENERATES A BACK EMF

[75] Inventors: Andre Brecy, Frahier; Francois Grudler, Bellort, both of France

[73] Assignee: Cii Honeywell Bull, Paris, France

[21] Appl. No.: 263,740

[22] Filed: May 14, 1981

Related U.S. Application Data

[63] Continuation of Ser. No. 17,918, Mar. 6, 1979, abandoned.

[30] Foreign Application Priority Data

Mar. 24, 1978 [FR] France .............................. 78 08618

[51] Int. Cl.³ .............................................. H02P 1/22
[52] U.S. Cl. .................................... 318/257; 318/331; 318/343
[58] Field of Search ....................... 307/71, 77, 63, 49, 307/50, 80, 81; 318/257, 258, 261, 269, 280, 293, 302, 331, 343, 368, 427

[56] References Cited

U.S. PATENT DOCUMENTS

| | | | |
|---|---|---|---|
| 3,343,073 | 9/1967 | Mesenhimer | 307/49 X |
| 3,396,323 | 8/1968 | Auld | 318/331 |
| 3,412,306 | 11/1968 | Fischer | 318/331 |
| 3,459,957 | 8/1969 | Kelley | 307/71 |
| 3,624,474 | 11/1971 | Nolf | 318/331 |
| 3,710,213 | 1/1973 | Hansen | 318/331 |
| 4,078,194 | 3/1978 | Johnson, Jr. | 318/331 |
| 4,112,340 | 9/1978 | Clarke | 318/331 |

FOREIGN PATENT DOCUMENTS

| | | |
|---|---|---|
| 2199918 | 4/1974 | France . |
| 899090 | 6/1962 | United Kingdom . |
| 989818 | 4/1965 | United Kingdom . |
| 1322424 | 7/1973 | United Kingdom . |
| 1330568 | 9/1973 | United Kingdom . |
| 1465114 | 2/1977 | United Kingdom . |

*Primary Examiner*—Ulysses Weldon
*Attorney, Agent, or Firm*—Lowe, King, Price & Becker

[57] ABSTRACT

A transistor having an emitter collector path connected in series with a d.c. power supply and a d.c. motor that derives a back emf as a function of motor speed is controlled so current selectively flows from the power supply through the transistor emitter collector path to the motor to drive the motor at differing speeds. The back emf of the motor has a tendency to become excessive for the transistor emitter collector path as the motor speed increases. The voltage of the supply is increased as the back emf increases to prevent the back emf from becoming excessive for the emitter collector path. A control source for the back emf is programmed in accordance with known speed and back emf characteristics of the motor as a function of time. The power supply voltage is increased and decreased in steps in response to variations of the programmed control source being above or below a threshold.

4 Claims, 4 Drawing Figures

CONTROL APPARATUS FOR AN ELECTRO-MECHANICAL DEVICE THAT GENERATES A BACK EMF

This is a continuation of application Ser. No. 017,918 filed Mar. 6, 1979, now abandoned.

FIELD OF THE INVENTION

The present invention relates generally to an apparatus for controlling the power applied to an electro-mechanical device that generates a back emf, and more particularly, to such an apparatus including a power supply that is varied as a function of the back emf.

BACKGROUND OF THE INVENTION

The most typical example of a device that produces a counter or back electro-motive force (back emf) is a d.c. motor. The invention is described in terms of a d.c. motor, but is to be understood that this example is not to be construed as limiting the devices capable of producing a back emf.

A familiar apparatus for supplying power to a d.c. motor, to control forward and reverse running of the motor, includes two d.c. power supply sources and two opposite conductivity type power transistors. The power transistors and power sources are connected in series in a loop so the motor is connected between a common terminal for the sources and a common terminal for like electrodes of the transistors. The transistors are activated so that one transistor is conducting while the other transistor is cut off so the motor is supplied with current from one of the d.c. sources to cause the motor to run in a first direction; the motor runs in a second, reversed direction in response to the opposite condition subsisting for the transistors, whereby current flows in the opposite direction through the motor from the second d.c. source. Generally, this type of circuitry includes a control circuit which activates, by pulses, one of the transistors to the exclusion of the other. In addition, to establish a reference potential, typically at ground level, the common terminal for like electrodes of the transistors is grounded.

Prior art devices of this type have numerous disadvantages. In particular, the series connection of the two power transistors limit the power which can be supplied to the motor because the maximum voltage which can be applied to the motor is equal to the sum of the supply voltages of the two d.c. power sources that are connected to the transistors and the motor. Another restriction is imposed by the maximum current which the two power transistors are able to supply when the back emf is at a maximum value, corresponding with a maximum speed for the motor. Because of the maximum voltage and maximum current restrictions, if the back emf rises to a maximum value simultaneously with a large torque being exerted on the motor shaft, the energy which can be supplied by the power transistor to the motor, while the motor is accelerating, is relatively low. Depending upon the torque magnitude, the energy supplied by the power transistor to the motor may be so small that a feedback loop responsive to the motor speed inaccurately represents the motor speed. Also, the relatively small margin within which transistors are able to operate while the motor is generating a large back emf imposes a corresponding restriction on the motor operation, both with regard to shaft speed and torque that the shaft can apply to a load. If the transistors are activated so that the motor is decelerated from a running condition, the back emf is added to the power supply voltage. Because the back emf and power supply voltage are added together, there are enormous peak currents when it is only desired to reduce the motor speed slightly. Hence, there is a major disparity between the actual and desired operating characteristics of a motor when it is supplied by the prior art device. In particular, it is not possible to overcome the high resisting torque with the prior art arrangement, nor is it possible to have a wide range of speeds.

BRIEF DESCRIPTION OF THE INVENTION

In accordance with the present invention, a power supply apparatus for an electro-mechanical device that generates a back emf includes at least one power transistor which is fed by a supply source to drive an output of the electro-mechanical device in a first direction. The value of the voltage supplied by the source through the power transistor to the electro-mechanical device is varied as a function of the back emf of the device. In a preferred embodiment, the value of the power supply voltage is controlled by a switch which controls connections of first and second d.c. power supplies which are connected in a loop with first and second transistors. The two transistors selectively connect the power supplies to the electro-mechanical device to control the direction in which the electro-mechanical device runs. In response to the back emf of the device being below a threshold, a switch is activated to connect a common terminal or tap for the two power supplies to one terminal of the electro-mechanical device, having a second terminal that is supplied with current by way of a conducting emitter collector path of one of the transistors. In response to the back emf exceeding a threshold level, a switch connects the two power supplies in series with each other to the first terminal of the electro-mechanical device and through the emitter collector path of the conducting transistor.

For the specific application of a d.c. motor that derives a back emf as a function of motor speed, the control apparatus comprises a d.c. power supply, a transistor having an emitter collector path connected in series with the motor and the d.c. power supply. The transistor is responsive to a source that controls the transistor so current selectively flows from the power supply through the emitter collector path to the motor to drive the motor at differing speeds. The back emf of the motor varies as a function of motor speed and has a tendency to become excessive for the emitter collector path as the motor speed increases. The voltage of the supply is varied as a function of the back emf to prevent the back emf from becoming excessive for the emitter collector path.

In one preferred embodiment, there are two d.c. voltage levels, and the larger d.c. level is connected in circuit with the motor and emitter collector path in response to the back emf being above a threshold; conversely, the lower d.c. voltage level is connected in circuit with the transistor and motor in response to the back emf being below a threshold.

To determine whether the back emf is above or below a threshold, the control source includes a programmed voltage source having an output in accordance with known speed and back emf characteristics of the motor. The level of the d.c. voltage is controlled in response to variations in the programmed source.

It is, accordingly, an object of the present invention to provide a new and improved apparatus for controlling the output of an electro-mechanical device having a back emf.

Another object of the invention is to provide a new and improved apparatus for controlling the voltage supplied to an electro-mechanical device having a back emf.

Another object of the invention is to provide a new and improved apparatus for controlling the voltage applied to an electro-mechanical device having a back emf and which is connected to the supply by way of a transistor emitter collector path, wherein tendencies for the back emf to become excessive for the emitter collector path are obviated.

Still another object of the invention is to provide a new and improved apparatus for controlling the power supplied to an electro-mechanical device having a back emf, wherein the simultaneous occurrence of a maximum back emf and a large torque on the motor does not have an adverse effect on the motor shaft speed and torque.

Still another object of the invention is to provide a new and improved apparatus for supplying power to an electro-mechanical device that derives a back emf wherein deceleration of the motor does not result in very large current peaks which can have a debilitating effect on the transistors.

The above and still further objects, features and advantages of the present invention will become apparent upon consideration of the following detailed description of one specific embodiment thereof, especially when taken in conjunction with the accompanying drawings.

DETAILED DESCRIPTION OF THE DRAWINGS

Figure 1:
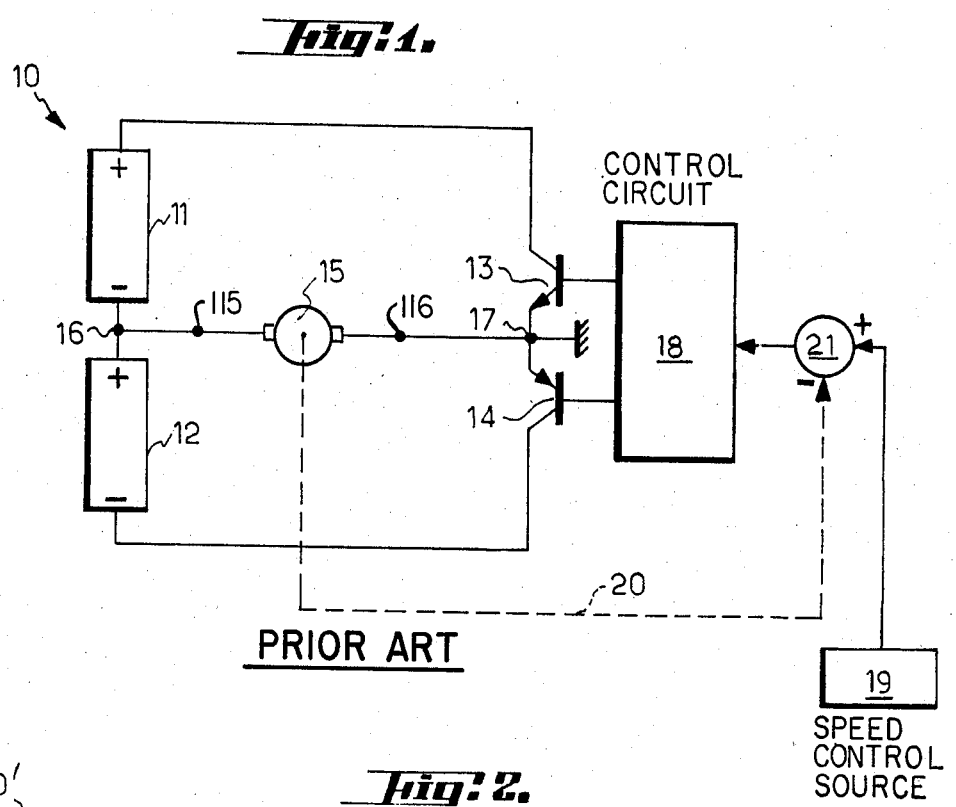
FIG. 1 is a view, partly in schematic form and partly in block diagram form, of a prior art power supply for a d.c. motor.

The prior art power supply illustrated in FIG. 1, for supplying bi-directional d.c. current of variable magnitude to motor 15, includes two series connected d.c. power sources 11 and 12 and two transistors 13 and 14 having emitter collector paths connected in a series loop with each other and the power supplies. D.C. motor 15 has a first armature terminal 115 connected to terminal 16 that is common to the negative and positive electrodes of power supplies 11 and 12, respectively. Armature terminal 116 of motor 15 is connected to common, grounded terminal 17 for the emitters of complementary, bi-polar NPN transistor 13 and PNP transistor 14. The collectors of transistors 13 and 14 are respectively connected to the positive and negative electrodes of d.c. sources 11 and 12. The bases of transistors 13 and 14 are connected to be responsive to complementary outputs of control circuit 18. The complementary outputs of control circuit 18 activate one of transistors 13 or 14 into a conductive state, depending upon the desired running direction for motor 15; transistors 13 and 14 respectively conduct for forward and reverse rotation of the motor. Control circuit 18 supplies variable voltages to the bases of transistors 13 and 14 to control the impedance of the emitter collector paths of the transistors, and thereby the current supplied by power supplies 11 and 12 to the armature of motor 15. In response to the magnitude and direction of the current supplied by supplies 11 and 12 to motor 15, the speed and running direction of the motor are controlled. The impedances of the emitter collector paths of transistors 13 and 14 are controlled in response to the d.c. currents applied respectively to the bases of the transistors by control circuit 18. Control circuit 18 responds to a d.c. signal representing the error in the speed of motor 15 relative to a desired value for the motor speed, as derived from d.c. source 19. The error voltage is derived by subtracting node 21, having a positive input responsive to the d.c. output of source 19 and a d.c. feedback voltage indicative of the speed and direction of rotation of shaft 20 of motor 15. The feedback signal supplied to the negative input of node 21 can be derived from any suitable d.c. source, such as a tachometer, responsive to the speed of shaft 20.

Figure 3:
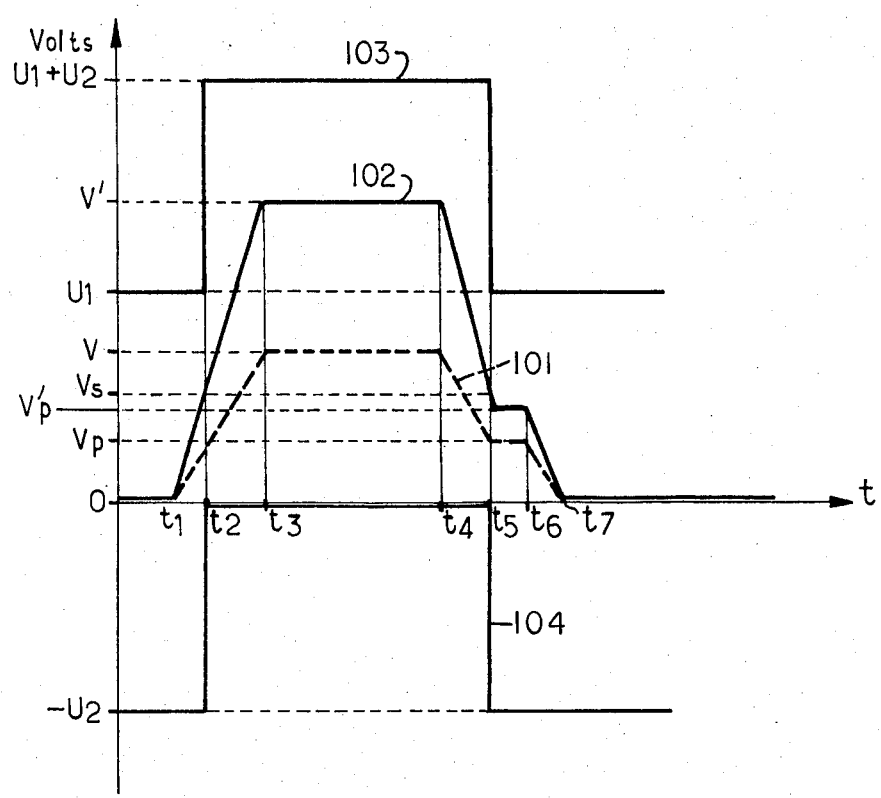
FIG. 3 is a series of curves indicating the operation of the devices illustrated in FIGS. 1 and 2.

An operating mode for forward running of motor 15 is indicated in FIG. 3 by broken-line curve 101 which represents the motor speed and motor back emf as a function of time while transistor 13 is forward biased during the interval $t_1$–$t_6$ in response to the output of controller 18. The maximum voltage applied by source 11 to motor 15 through the emitter collector path of forward biased transistor 13 is represented by the constant voltage level $U_1$, a value which is generally between sixty and eighty volts. The voltage of source 12 which is applied to motor 15 in response to the emitter collector path of transistor 14 being forward biased is represented by the constant level $-U_2$, a magnitude which is generally lower than, but sometimes equal to, the magnitude of voltage $U_1$. The voltage derived from generator 19 during the interval $t_1$–$t_4$ results in motor 15 turning at a constant forward speed, v, during the interval $t_3$–$t_4$, at which time generator 15 derives a back emf having a value V. Because the back emf and shaft speed of motor 15 have the same wave shape, both are indicated by waveform 101. Prior to reaching the constant shaft speed, v, and back emf, V, the motor back emf and shaft speed linearly increase, during the interval $t_1$–$t_3$, from zero to the constant values. Source 19 is programmed to decelerate the shaft of motor 15 and reduce the shaft speed to a relatively low value, $v_p$, at time $t_4$. Shaft speed $v_p$ is reached at time $t_5$, whereby the motor shaft speed and back emf linearly decrease during the interval $t_4$–$t_5$. During the interval $t_5$–$t_6$, the output of source 19 maintains the shaft speed of motor 15 at a relatively low, constant value until motor shaft 20 reaches a position immediately in front of a desired stopping position. When the shaft of motor 15 reaches this position, the voltage derived from source 19 is decreased to a zero level, whereby the emitter collector path of transistor 13 is increased to a cut off condition, from the relatively high impedance condition which exists during interval $t_5$–$t_6$. In response to the emitter collector path of transistor 13 being cut off, the shaft speed and back emf of motor 15 are reduced to zero, as indicated by the ramp in waveform 101 during the interval $t_6$–$t_7$. In certain instances, generator 19 is programmed so that the constant shaft speed and back emf of motor 15 during interval $t_5$–$t_6$ are not achieved, but the shaft speed and back emf are reduced immediately to a zero value.

While motor 15 has a constant shaft speed, v, during the interval $t_3-t_4$, the collector emitter voltage, $V_{ce}$, of transistor 13 is limited to the difference in the back emf across motor 15 relative to the voltage of d.c. source 11, $U_1-V$. However, the available breaking voltage of motor 15 at $t_4$, when the command is given for initial celeration of the motor, corresponds to $U_2+V$, the arithmetic sum of the motor back emf, V, and the voltage of d.c. power supply 12, $U_2$. The sum ($U_2+V$) is generally excessively large for the emitter collector path of cut off transistor 14, whereas the maximum voltage which is developed across the emitter collector path of transistor 13 is frequently excessively small, so that adequate voltage is not supplied to the motor to maintain it in a running condition. The present invention overcomes these problems.

Figure 2:
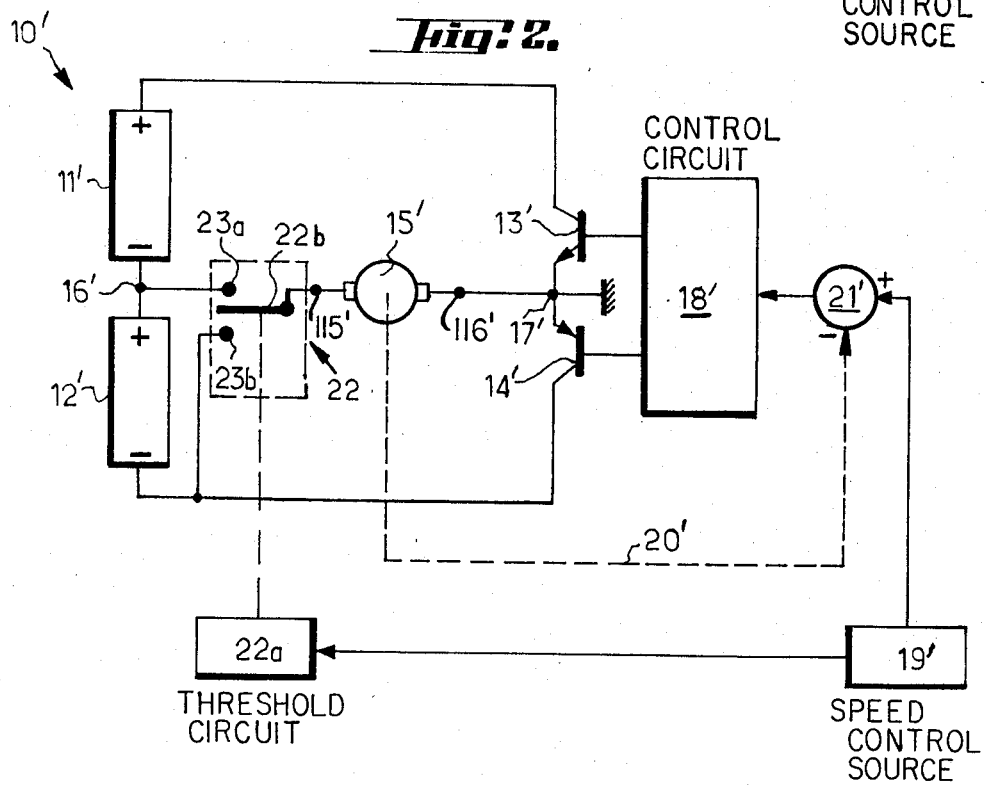
FIG. 2 is a view, similar to FIG. 1, of an apparatus for supplying power to a d.c. motor in accordance with the invention.

A preferred embodiment of the invention is illustrated in FIG. 2. In order to clearly identify the similarity between the circuits of FIGS. 1 and 2, the same reference numerals indicate like components in the two figures, with the addition of primes in FIG. 2 for corresponding elements.

The only differences between the circuits of FIGS. 1 and 2 is that the latter incorporates a regulator to vary the value of the d.c. voltage supplied to motor 15 as a function of the back emf produced by the motor and control source 19 includes an auxiliary voltage source that is programmed in accordance with known speed and back emf characteristics of the motor in response to voltage differences for initial and final speed conditions over any interval. In particular, source 19 includes an auxiliary output which, for the situation illustrated in FIG. 3, has a wave shape identical with the shape of waveform 101.

Control source 22 responds to the programmed output of generator 19 to control the voltage applied to terminals 115' and 116' of motor 15' as a function of the motor back emf, as indicated by the output of generator 19', as coupled to threshold circuit 22a. Circuit 22a has an output that controls contact 22b of double pole single throw switch 22. Contact 22b is normally biased to engage contact 23a of switch 22 so that in response to the output of generator 19' that is applied to threshold circuit 22a being below the threshold value, $V_s$, the voltage at terminal 16'0 is fed to terminal 115' of motor 15'. In response to the output of source 19' that is applied to threshold device 22a exceeding threshold level $V_s$, contact 22b is energized to engage contact 23b. In response to contact 23b being engaged by contact 22b, d.c. sources 11' and 12' are connected in series with each other and across terminals 115' and 116' by way of the emitter collector path of transistor 13'. Simultaneously, the bias voltage across the emitter collector path of cut off transistor 14' is only the back emf between terminals 115' and 116' of motor 15'.

Reference is now made to the solid line curves 102, 103, and 104 of FIG. 3 to indicate the features and advantages of the invention. To distinguish between the curves representing the speed characteristics of motors 15 and 15' for the circuits of FIGS. 1 and 2, assume that generator 19' commands a forward rotation of motor 15' at a speed v', corresponding to a back emf of V'. In addition, to enable the advantages of the invention to be more clearly realized, assume that speed v' equals 2v. From the curves of FIG. 3, the back emf V' exceeds the voltage $U_1$ of power supply source 11, whereby under the assumed circumstances, it would be impossible to obtain the back emf V' with the circuit illustrated in FIG. 1.

In accordance with the present invention, however, motor 15' starts from rest at time $t_1$ while contact 22b engages contact 23a, to supply the voltage at terminal 16' to terminal 115' of motor 15'. This configuration is the same as the configuration illustrated in FIG. 1. Motor 15' accelerates, at relatively constant speed, during the interval $t_1-t_2$. At time $t_2$, when the motor back emf reaches the predetermined threshold value $V_s$, threshold detector 22a responds to the output of generator 19' so that power supplies 11' and 12' are connected in series between terminals 115' and 116' via the emitter collector path of transistor 13', whereby the applied voltage across terminals 115' and 116' is equal to $U_1+U_2$, as indicated by waveform 103, FIG. 3. There is thus a net positive voltage across emitter collector path of transistor 13', as indicated by the difference in waveforms 102 and 103, FIG. 3, which respectively represent the voltage applied by sources 11' and 12' to motor 15' and the motor back emf. Because potentials $U_1$ and $U_2$ are added together, transistor 14' is able to short circuit motor 15', to provide dynamic breaking for the motor. On the other hand, the voltage applied between the emitter and collector of transistor 13' is positive, whereby the motor can be accelerated until it produces a back emf greater than the voltage of power supply 11'. The maximum back emf of motor 15' occurs during the interval $t_3-t_4$, during which time the motor is driven at a constant rotational speed. It is noted that although V'=2V, the collector emitter voltage $V_{ce}$ of transistor 13' ($V_{ce}=U_1+U_2-V'$) remains appreciably greater than the voltage $V_e$ which is developed across transistor 13 in the prior art circuit of FIG. 1, during the interval $t_3-t_4$.

Generally, switch 22 has the advantage of maintaining the voltage between the emitter and collector of transistor 13' substantially constant despite large variations in the back emf generated by motor 15'. Maintaining the voltage between the emitter and collector of transistor 13' substantially constant enables a higher speed and greater torque to be derived from the motor. In addition, breaking potential, $V_f$, is at most equal to the arithmetic sum of the threshold value of circuit 22a and the value $U_2$ of source 12' while contacts 22b and 23a are engaging each other, and that it is at most equal to $V_s$ while switch 22 is in its other state, while contacts 22b and 23b are engaged. While motor 15' is decelerating, the motor operation is the reverse of that when the motor is accelerating. Hence, at time $t_4$ motor 15' decelerates until time $t_5$ when the back emf threshold $V_s$ is reached, to cause contact 22b to switch from contact 23b back to contact 23a. Thereby, during the interval $t_5-t_7$ voltages sources 11' and 12' are respectively connected across the emitter collector paths of transistors 13' and 14', respectively. During the interval $t_5-t_6$, the shaft speed of motor 15' is relatively constant, at a low value, for position finding. At time $t_6$, the emitter collector path of transistor 13' is cut off and the motor stops at the desired position at time $t_7$.

It is readily appreciated that the effectiveness of controller 22, in accordance with the invention, is increased if it is able to maintain the emitter collector voltage of transistor 13' at a constant value. While the switching arrangement of the circuit illustrated in FIG. 2 is discontinuous and does not continuously maintain the emitter collector voltage of transistor 13' at a constant value, it has the advantage of being easy to implement. From the discussion above, with regard to FIG. 2, it is evident that the voltage supplied to motor 15' can be continuously varied over a predetermined range of motor back emf, as a function of the back emf, to maintain the emitter collector voltage of transistor 13' approximately constant. In addition, the present invention can be implemented by employing a d.c. power supply having numerous taps which are selectively connected in circuit with motor 15' in a predetermined pattern as a function of the motor back emf, in accordance with the desired running direction of the motor.

Figure 4:
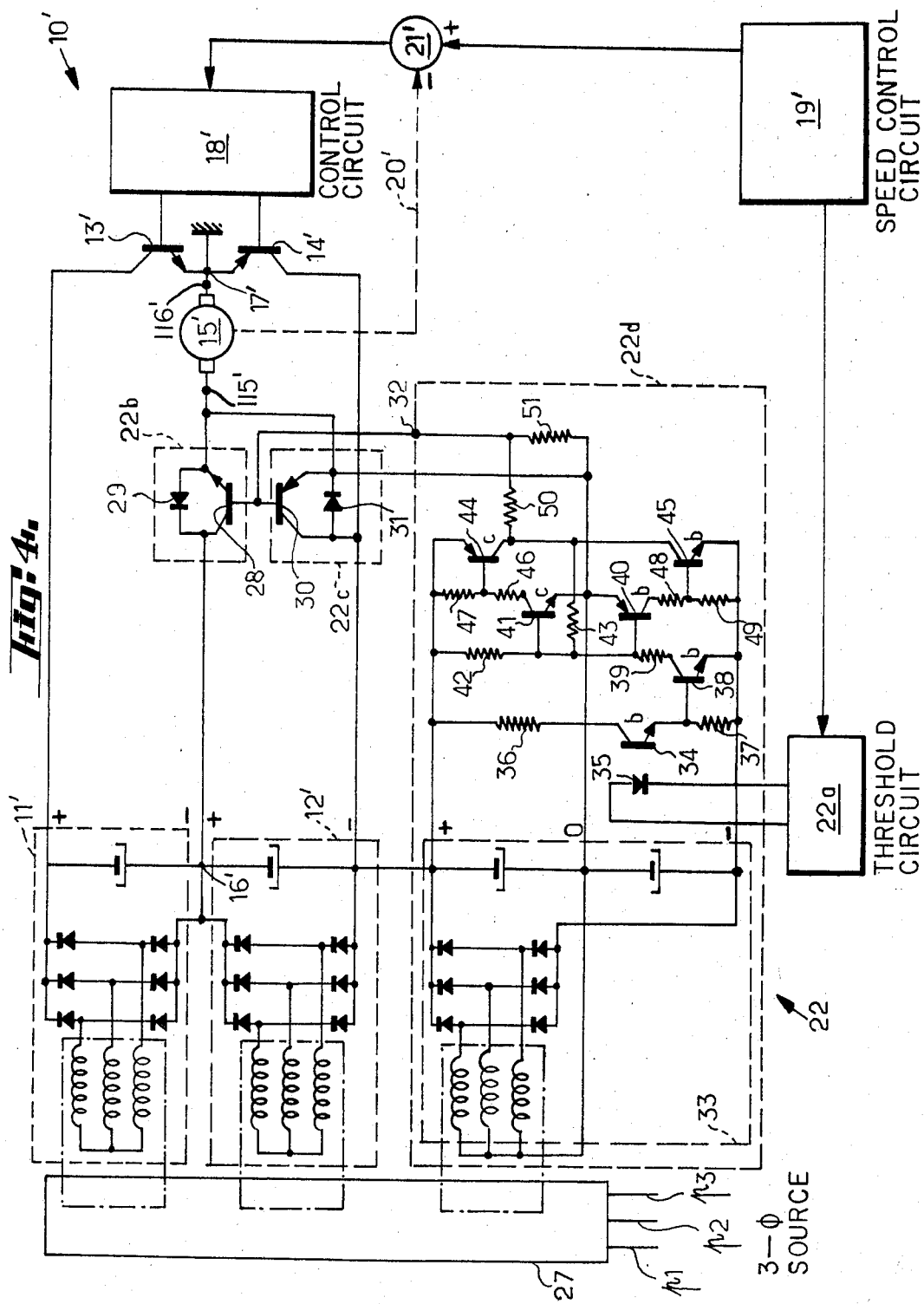
FIG. 4 is a circuit diagram of one preferred embodiment of the apparatus illustrated in FIG. 2.

Reference is now made to FIG. 4 of the drawing wherein a detailed circuit diagram of a portion of the apparatus illustrated in FIG. 2 is provided. Identical devices in the circuits of FIGS. 2 and 4 are identified by identical reference numerals. In FIG. 4 are schematically illustrated motor 15', transistors 13' and 14', control circuit 18', motor shaft 20', difference node 21', and threshold circuit 22a. Illustrated in detail in the circuit of FIG. 4 are single pole double throw switch 22 and control network 22d which controls switch 22 in response to a bi-level output of threshold circuit 22a. In addition, d.c. power supplies 11' and 12' are illustrated as a.c. to d.c. converters responsive to a three phase, a.c. source. The a.c. to d.c. converters comprising power supplies 11' and 12' include a Graetz bridge in a d.c. power supply, having a filter capacitor connected in shunt with a three phase full wave diode rectifier. In FIG. 4 is also illustrated a bi-polar a.c. to d.c. converter 33 responsive to the three phase source via a Graetz bridge, and which supplies positive and negative d.c. power supply voltages and a neutral voltage to control circuit 22d.

As illustrated in FIG. 4, single pole double throw switch 22 is actually an electronic switch including NPN transistor 28 having an emitter collector path connected in series between terminals 16' and 115' and in shunt with diode 29 that is poled in an opposite direction from the direction of current flow through the emitter collector path of the transistor. The emitter collector path of transistor 28 and its shunt diode 29 can be thought of as comprising switch contact 22b when it engages contact 23a. An engaging relationship between contact 22b and contact 23b is established through the emitter collector path of PNP transistor 30 which is shunted by diode 31, that enables current to flow through it in a direction opposite the normal direction of current flow through the emitter collector path of transistor 30. The emitter collector path of transistor 30 is connected between the negative power supply electrode or terminal of power supply 12' and terminal 115' of motor 15'. Base electrodes of transistors 28 and 30 have a common connection to output terminal 32 of circuit 22d, whereby transistors 28 and 30 are back biased and forward biased at mutually exclusive times.

Control circuit 22d responds to the bi-level output of threshold circuit 22a to control the forward and reverse biases applied to the bases of transistors 28 and 30. Control circuit 22d includes a light emitting diode 35 which is forward biased in response to a positive output voltage of threshold detector 22a, as occurs when the threshold detector is supplied with a voltage greater than threshold voltage $V_s$, FIG. 3. In response to diode 35 being forward biased, the diode emits a beam of light that irridiates the base of phototransistor 34 to forward bias the emitter collector path of the phototransistor. The collector and emitter of phototransistor 34 are respectively connected to the positive and negative d.c. power supply voltages of source 33 by way of load resistors 36 and 37, respectively. The voltage developed across load resistor 37, in the emitter circuit of phototransistor 34, is d.c. coupled to the base of NPN transistor 38 which is thereby forward biased in response to the threshold of detector 22a being exceeded. The emitter of transistor 38 is connected directly to the negative d.c. power supply voltage of source 33, while the collector of transistor 38 is connected to the positive d.c. power supply voltage by way of series connected resistors 39 and 42. The voltage at the common terminal of resistors 39 and 42 is coupled in parallel to the bases of complementary bipolar transistors 40 and 41, respectively of the PNP and NPN types. The emitters of transistors 40 and 41 have a common connection to the neutral or zero voltage level of power supply 33, which is also connected directly to the emitters of transistors 28 and 30. The collector of NPN transistor 41 is connected to the d.c. power supply terminal of source 33 by way of series connected resistors 46 and 47, while the collector of PNP transistor 40 is connected to the power supply negative d.c. terminal by way of series connected resistors 48 and 49. The voltage at the common terminal of tap between resistors 46 and 47 is d.c. coupled to the base of PNP transistor 44. The base of NPN transistor 45 is similarly responsive to the d.c voltage at the tap between resistors 48 and 49. The emitters of transistors 44 and 45 are respectively connected to the positive and negative output electrodes of power supply 33, while the collectors of transistors 44 and 45 have a common connection. Current flowing to the common connection of the collectors of transistors 44 and 45 is coupled in a degenerative feedback network to the bases of transistors 40 and 41 by way of resistor 43. Transistors 44 and 45 are basically in a push-pull type configuration whereby transistor 44 is conducting while transistor 45 is cut off, and vice versa. The voltage developed between the common collectors of transistors 44 and 45 and the common connection for the emitters of transistors 40 and 41 is coupled to the bases of transistors 28 and 30 by way of a resistive voltage divider including series resistors 50 and 51. Resistors 50 and 51 have opposite terminal respectively connected to the common collectors of transistors 44 and 45 and to the emitters of transistors 40 and 41; a tap for the common terminals of resistors 50 and 51 is d.c. coupled by way of terminal 32 to the bases of transistors 28 and 30.

Prior to time $t_2$, FIG. 3, transistor 28 is forward biased while transistor 30 is back biased, a result achieved by supplying a positive voltage to the common connections for the bases thereof. This result is achieved because threshold detector 22a fails to forward bias phototransistor 35, whereby transistors 34 and 38 are cut off, which results in transistors 41 and 44 being forward biased while transistors 40 and 45 are cut off. The forward bias of transistor 44 results in a positive voltage being applied to resistor 50 and a positive voltage being applied to the bases of transistors 28 and 30. In response to the threshold value $V_s$ of detector 22a being exceeded, the light output of photo detector 35 forward biases transistors 34 and 38, which results in transistors 41 and 44 being back biased while transistors 40 and 45 are forward biased. The forward bias of transistor 45 results in a negative voltage being applied to one terminal of resistor 50 and to the common terminal of resistors 50 and 51. The common voltage at the tap between resistors 50 and 51 is coupled to the bases of transistors 28 and 30, forward biasing the latter.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Apparatus for controlling the speed and running direction of a d.c. motor comprising first and second transistors having emitter collector paths, electrodes of said paths having a first common connection, a d.c. power supply having first and second output electrodes and an intermediate tap, the voltages at the first and second output electrodes being respectively at potentials greater than and less than the voltage at the tap, means for connecting the motor in circuit with the power supply, the first common connection and the paths so current flows through the motor in a first direction between the first output electrode and the tap through the path of the first transistor and in a second direction through the motor between the second output electrode and the tap through the path of the second transistor, said means for connecting including means for altering the motor connections to the power supply so current flows in the first direction through the motor between the first and second output electrodes through the path of the first transistor and the total voltage between the first and second output electrodes is connected across the first transistor and motor.

2. The apparatus of claim 1 wherein the means for altering includes a control source programmed in accordance with known speed and back emf characteristics of the motor, said means for connecting being responsive to the control source to sense whether the known back emf is above or below a threshold.

3. Apparatus for controlling the d.c. power supply voltage applied to a d.c. motor that derives a back emf as a function of motor speed comprising a transistor having an emitter collector path connected in series with the d.c. power supply and the d.c. motor, means for controlling the transistor emitter collector impedance so different current magnitudes selectively flow from the power supply through the transistor emitter collector path to the motor to drive the motor at differing speeds, the motor back emf having a tendency to become excessive for the transistor emitter collector path as the motor speed increases, and supply voltage varying means including a programmed control source for the back emf, said control source being programmed in accordance with known speed and back emf characteristics of the motor as a function of time, and means for increasing and decreasing the power supply voltage when variations of the programmed control source are respectively above and below a threshold to prevent the back emf from becoming excessive for the collector emitter path.

4. Apparatus for controlling the speed of a d.c. motor comprising a programmed speed control source for deriving a control output signal having a predetermined amplitude-time relationship for a desired speed-time characteristic, first and second transistors having emitter collector paths, electrodes of said paths having a common connection, means responsive to the actual motor speed and the control signal for deriving an error signal indicative of an error between the control signal and the actual motor speed, means responsive to the error signal for controlling the impedances of emitter collector paths of the first and second transistors, a d.c. power supply having first and second output electrodes and an intermediate tap, the voltages at the first and second output electrodes being respectively at potentials greater than and less than the voltage at the tap, means responsive to an indication of the desired speed for the motor as derived from the speed control source respectively increasing and decreasing for connecting the motor in circuit with the power supply, the common connection and the paths so current flows through the motor in a first direction between the first output electrode and the tap through the path of the first transistor and in a second direction through the motor between the second output electrode and the tap through the path of the second transistor, said means for connecting including means responsive to an indication of the desired motor speed being above a predetermined value for altering the motor connections to the power supply so current flows in the first direction through the motor between the first and second output electrodes through the path of the first transistor and the total voltage between the first and second electrodes is connected across the first transistor and motor.

* * * * *